(12) United States Patent
Schlafer

(10) Patent No.: US 10,619,835 B2
(45) Date of Patent: Apr. 14, 2020

(54) PORTABLE FLASHLIGHT FOR UNDERWATER USE

(71) Applicant: Norbert Schlafer, Eger (HU)

(72) Inventor: Norbert Schlafer, Eger (HU)

(*) Notice: Subject to any disclaimer, the term of this patent is extended or adjusted under 35 U.S.C. 154(b) by 68 days.

(21) Appl. No.: 16/094,611

(22) PCT Filed: Dec. 16, 2016

(86) PCT No.: PCT/HU2016/050064
§ 371 (c)(1),
(2) Date: Oct. 18, 2018

(87) PCT Pub. No.: WO2017/182831
PCT Pub. Date: Oct. 26, 2017

(65) Prior Publication Data
US 2019/0170337 A1  Jun. 6, 2019

(30) Foreign Application Priority Data

Apr. 18, 2016 (HU) .................................... 1600259

(51) Int. Cl.
*H02J 7/00* (2006.01)
*F21V 25/04* (2006.01)
*F21V 31/00* (2006.01)
*F21L 4/08* (2006.01)
*F21V 23/04* (2006.01)
*F21Y 115/10* (2016.01)

(52) U.S. Cl.
CPC ................ *F21V 25/04* (2013.01); *F21L 4/08* (2013.01); *F21V 23/04* (2013.01); *F21V 23/0414* (2013.01); *F21V 31/00* (2013.01); *H02J 7/0042* (2013.01); *H02J 7/0044* (2013.01); *H02J 7/0045* (2013.01); *F21Y 2115/10* (2016.08)

(58) Field of Classification Search
CPC ..................................................... H02J 7/0042
USPC ......................................... 320/107, 112–115
See application file for complete search history.

(56) References Cited

U.S. PATENT DOCUMENTS 8,143,849 B2 * 3/2012 Miglioranza ......... H02J 7/1407
320/107
2008/0116845 A1 * 5/2008 Sonnenschein ....... H02J 7/0031
320/107

* cited by examiner

*Primary Examiner* — Edward Tso
*Assistant Examiner* — Ahmed H Omar
(74) *Attorney, Agent, or Firm* — Olson & Cepuritis, Ltd.

(57) ABSTRACT

The object of the invention relates to a Portable flashlight for underwater use, which flashlight (10) has a waterproof casing (12), a rechargeable battery (14) arranged within it, a light source (15), as well as at least one charging connection (16, 16p, 16n) arranged on the external surface of the casing (12) and electrically isolated from the casing (12), and a first electric circuit (A1) is provided for ensuring electric connection between the rechargeable battery (14) and the at least one charging connection (16), and a second electric circuit (A2) is provided for ensuring electric connection between the rechargeable battery (14) and the light source (15). The portable flashlight comprises a charging switching unit (22) that has—a first switch (K11) connected to the first circuit (A1) for breaking the first circuit (A1) in a first position and for closing the first circuit (A1) in a second position, and—a charging switch controller (29) for controlling the first switch (K11) with the help of a first magnet (104) being outside the casing (12).

20 Claims, 12 Drawing Sheets

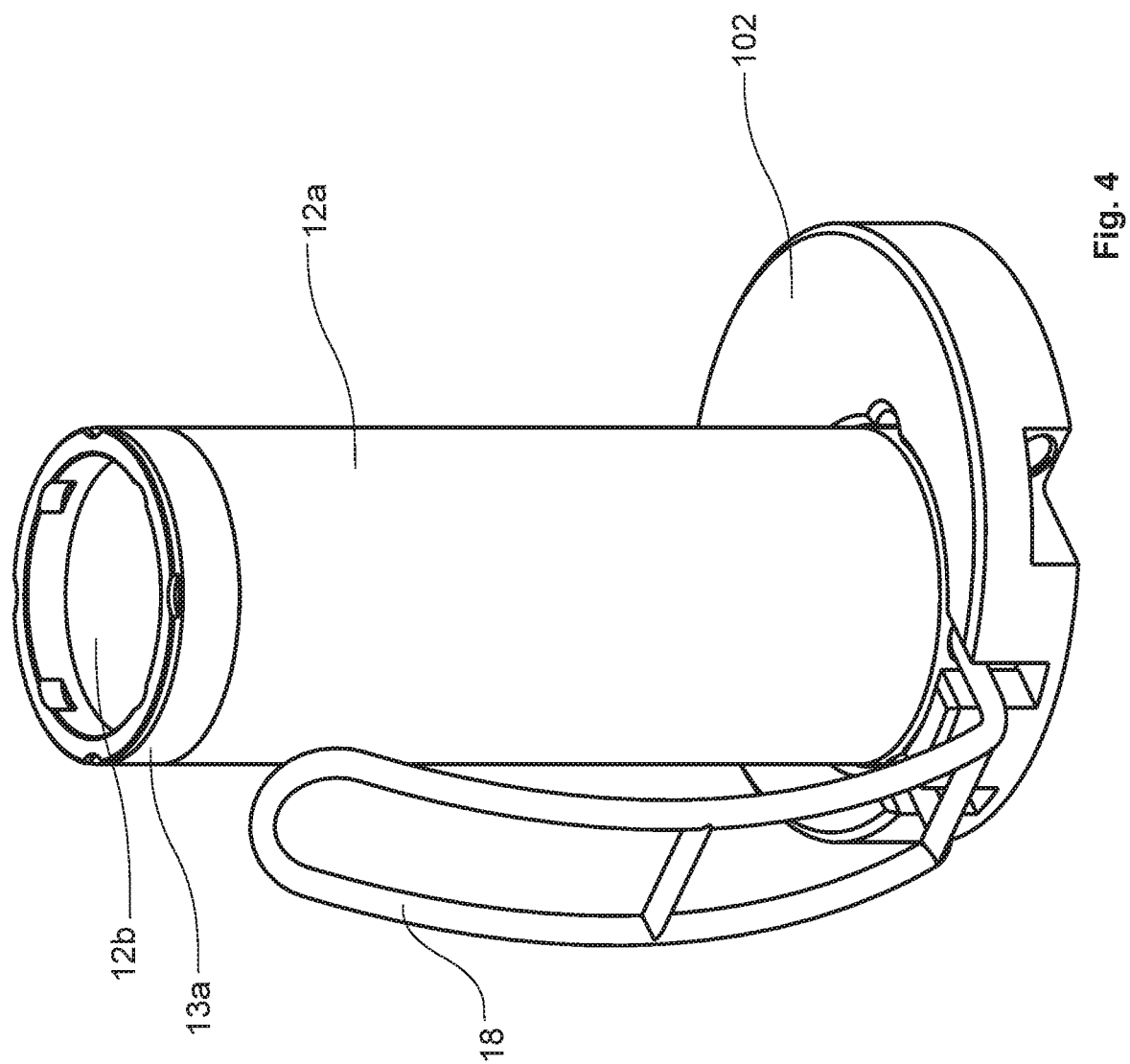

PORTABLE FLASHLIGHT FOR UNDERWATER USE

CROSS-REFERENCE TO RELATED APPLICATIONS

This application is a U.S. National Stage of PCT/HU2016/050064, filed Dec. 16, 2016, which claims priority of Hungarian Patent Application No. P1600259, filed Apr. 18, 2016, each of which is incorporated herein by reference.

The object of invention relates to a portable flashlight for underwater use, which flashlight has a waterproof casing, a rechargeable battery arranged within it, a light source, as well as at least one charging connection arranged on the external surface of the casing, and a first electric circuit is established ensuring an electric connection between the rechargeable battery and the at least one charging connection, and a second electric circuit is established ensuring electric connection between the rechargeable battery and the light source.

Portable flashlights suitable for long-term underwater use (diving flashlights) are currently known of from the prior art. By using a portable power supply (such as a battery pack) these flashlights are able to ensure appropriate light conditions for a long time under the surface of the water.

A power supply that has run down during use has to be replaced, and/or recharged. In the case of the currently widespread solutions, replacing the power supply requires the periodical opening of the waterproof casing of the flashlight. Regular disassembly of the casing may lead to faster wearing of the components (e.g. threads, insulation, etc.) and to the flashlight becoming damaged. A further disadvantage of such solutions is that they create the possibility of faults, as the waterproof nature of the flashlight, and its operation are also influenced by whether the user has properly assembled the casing and inserted the power supply after replacing the power supply. The above disadvantages also relate to those solutions that contain a rechargeable power supply (e.g. rechargeable batteries).

A special case of the aforementioned solutions is when the power supply is established as a rechargeable module that may be detached from the flashlight. Charging of the module usually takes place with it being detached from the flashlight, using a separate charging unit. The greatest disadvantage of this modular solution is that in the lack of a unified casing it is difficult to ensure that the flashlight is waterproof, and that the regular connection and disconnection of the module may accelerate the wear and tear of the flashlight.

The disadvantages presented above may be overcome by using power supplies built into the waterproof casing that may be charged through a charging connection established outside of the casing. Several diving flashlights containing a built in power supply are commercially available, such as the portable underwater flashlight type Sub M3 produced by the Exposure Marine company. Several types of charging device are suitable for charging the integrated lithium-ion batteries, such as the charging devices with type numbers NCP 1851 and NCP 1851A known of to persons skilled in the art.

In spite of their numerous advantages, the great disadvantage of the currently existing flashlights containing a built in power source is that the charging connection must be insulated in order to prevent the built in power supply from self-discharging while being used under water. However, it is difficult to insulate the charging connections and makes the use of the flashlight difficult, as the user must remove the insulation in order to charge the battery, so the insulation can be easily lost or become damaged. A further disadvantage of the present solutions is that incorrectly replacing the insulation may cause the flashlight to become faulty during use and cause water to leak into the device.

The circuit arrangement disclosed in patent application no. US 2008/0116845 desires to provide a solution to this problem, which ensures that the charging connections of the device are only electrically connected to the battery during charging, so it is not necessary to separately insulate them. A voltage-controlled relay is installed between the charging connector and the battery, which, when inactive, connects the battery to the electric consumer, and when active it interrupts the connection between the battery and the electric consumer, and connects the battery to the charging connection. The disadvantage of this solution is that the charging of the device may also be started with the electric consumer (e.g. light source) switched on, and although the electric consumer is continuously switched off during charging, the electric consumer switches on again when charging is complete. This may cause the unintentional running down of the device. A further disadvantage of the solution is that as only the voltage connected to the charging connection controls the relay, and no other switch or safety element is built into the circuit, the device may be charged with various chargers. However, using a non-original charger may damage the device.

The waterproofness of the device casing may foe increased, for example, by replacing traditional switches with magnetic switches that do not require the unity of the casing being broken. U.S. Pat. No. 7,920,163 discloses a digital camera for underwater use fitted with such switches. The magnetic switch may contain a reed relay or a Hall sensor according to the specification.

It was recognised that with the help of a magnetic switch arranged within the waterproof casing of the flashlight, and a charger unit suitable for activating the magnetic switch, a flashlight suitable for use under water may be created in which the electric connection between the charging connection and the built in battery is interrupted when the flashlight is being used under water, therefore it is not necessary to separately insulate the charging connection.

It was also recognised that by appropriately establishing the electronics of the flashlight it can be achieved that the charging of the flashlight only be initiated after switching off the flashlight.

It is an object of the present invention is to provide a portable flashlight suitable for underwater use and a charger unit that may be attached to it which is free of the disadvantages of the solutions according to the state of the art. The objective is especially to create a flashlight suitable for underwater use with a built in power supply the charging connections of which do not need to be insulated for underwater use and which can only be charged after switching off the flashlight.

The invention is based on the recognition that by using a magnetic switch arranged within the flashlight's waterproof casing and a charger unit that is suitable for activating the magnetic switch, a flashlight with a built in power supply suitable for use under water may be created the charging connections of which do not need to be insulated for underwater use.

According to the invention the task was solved with the flashlight according to claim 1.

Advantageous embodiments of the invention are defined in the attached dependent claims.

Further details of the invention will be apparent from the accompanying figures and exemplary embodiments.

FIG. 2a is a schematic circuit diagram of the main elements of the flashlight illustrated in FIG. 1a.

FIG. 2d is a schematic circuit diagram illustrating the first circuit according to FIG. 2a.

FIG. 2e is a schematic circuit diagram illustrating the first control circuit according to FIG. 2a.

FIG. 2f is a schematic circuit diagram illustrating the second circuit according to FIG. 2a.

FIG. 2g is a schematic circuit diagram illustrating the second control circuit according to FIG. 2a.

FIG. 4 is a perspective view of the flashlight connected to the charger unit presented in FIG. 3.

Figure 1A:
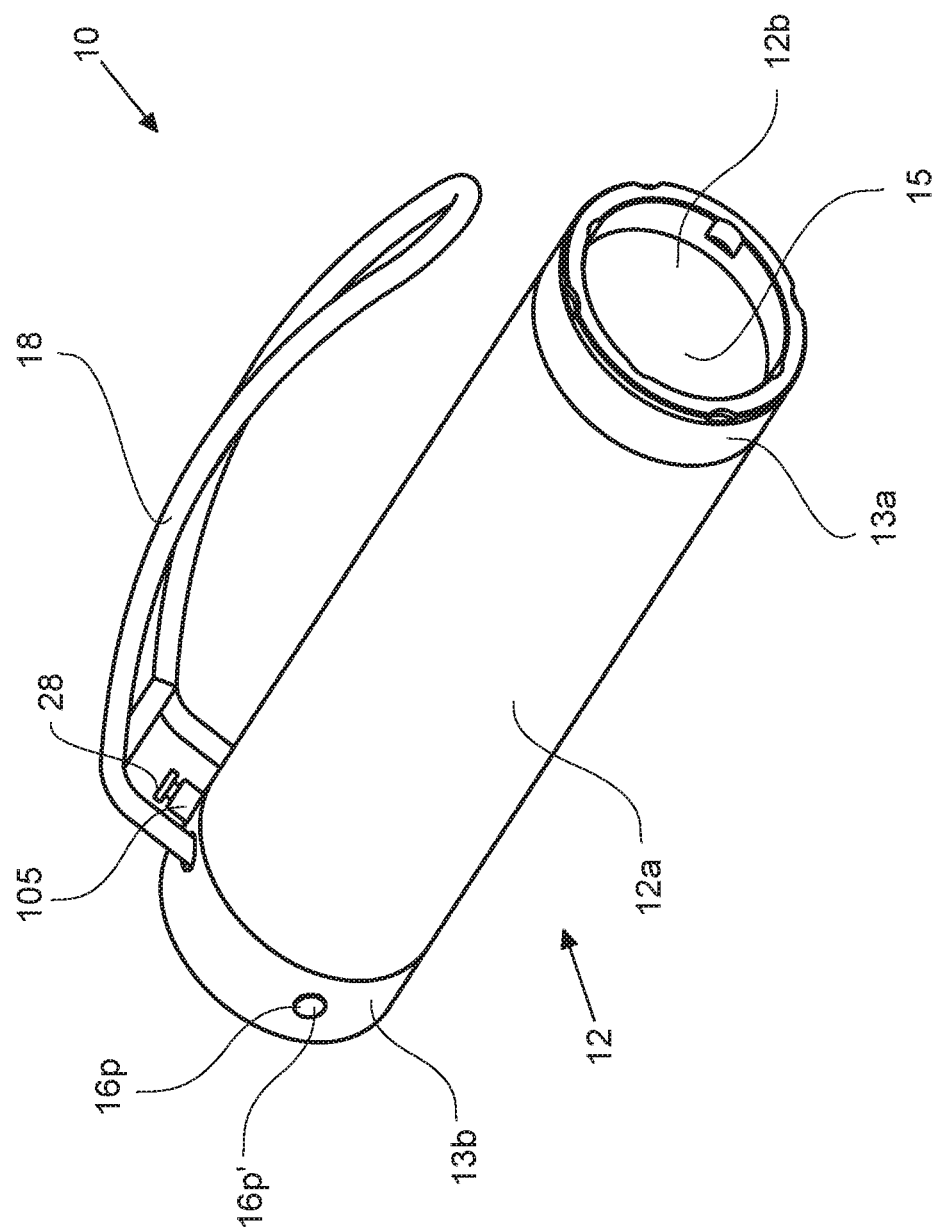
FIG. 1a is a schematic perspective image of a preferable embodiment of a portable flashlight according to the invention.
Figure 1B:
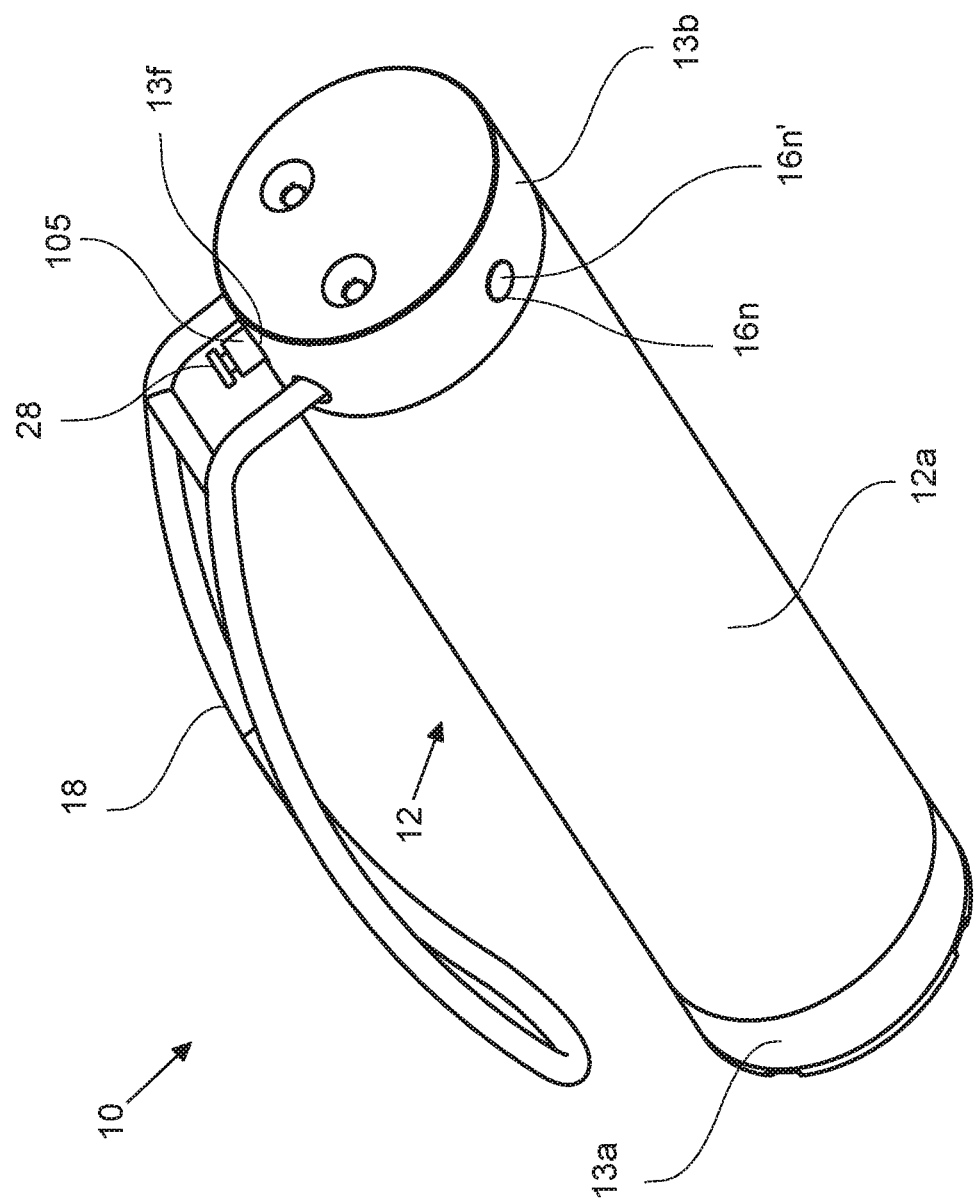
FIG. 1b is a schematic perspective image of the flashlight visible in FIG. 1a from another direction.

Perspective views from different directions of the portable flashlight 10 suitable for underwater use according to the invention may be seen in FIGS. 1a and 1b. In the interest of better illustration, the main elements of the flashlight 10 are presented in FIG. 1c (exploded figure). The flashlight 10 has a waterproof casing 12, a rechargeable battery 14 arranged within it, a light source 15 and at least one charging connection 10 arranged on the external surface of the casing 12. In the context of the present invention waterproof casing 12 is understood to mean a preferably rigid waited closed surface delimiting a closed internal space through which wafer is unable to penetrate, in other words unable to get into the closed internal space.

In the case of a preferable embodiment the casing 12 contains a frame 12a and a light-transmitting region 12b that permits at least a pan of visible light to pass through it. The frame 12a is a rigid walled, preferably cylindrical mantle shaped or other hollow body that is made from a material or materials resistant to water, especially salty seawater, such as anodised aluminium coated with a plastic film, titanium, carbon fibre, plastic, etc. In the case of an especially preferable embodiment the frame 12a is coated with a film made using UV printing, which is exceptionally hardwearing and abrasion-resistant. The film is preferably laminated, which further increases its mechanical resistance.

In the context of the present Invention light transmitting characteristic is understood to mean that the light-transmitting region 12b at least partially permits at least a part of the visible range of electromagnetic radiation to pass through it at least from the direction of the light source 15. The light transmitting region 12b is a sheet made from glass or other transparent material, such as acrylic glass, the thickness of which is preferably between 4 and 8 mm. The light-transmitting region 12b is preferably a flat sheet with even thickness, which permits the light of the light source 15 to pass through it without substantially refracting it but naturally any optional shape of light-transmitting region 12b is conceivable.

Figure 1C:
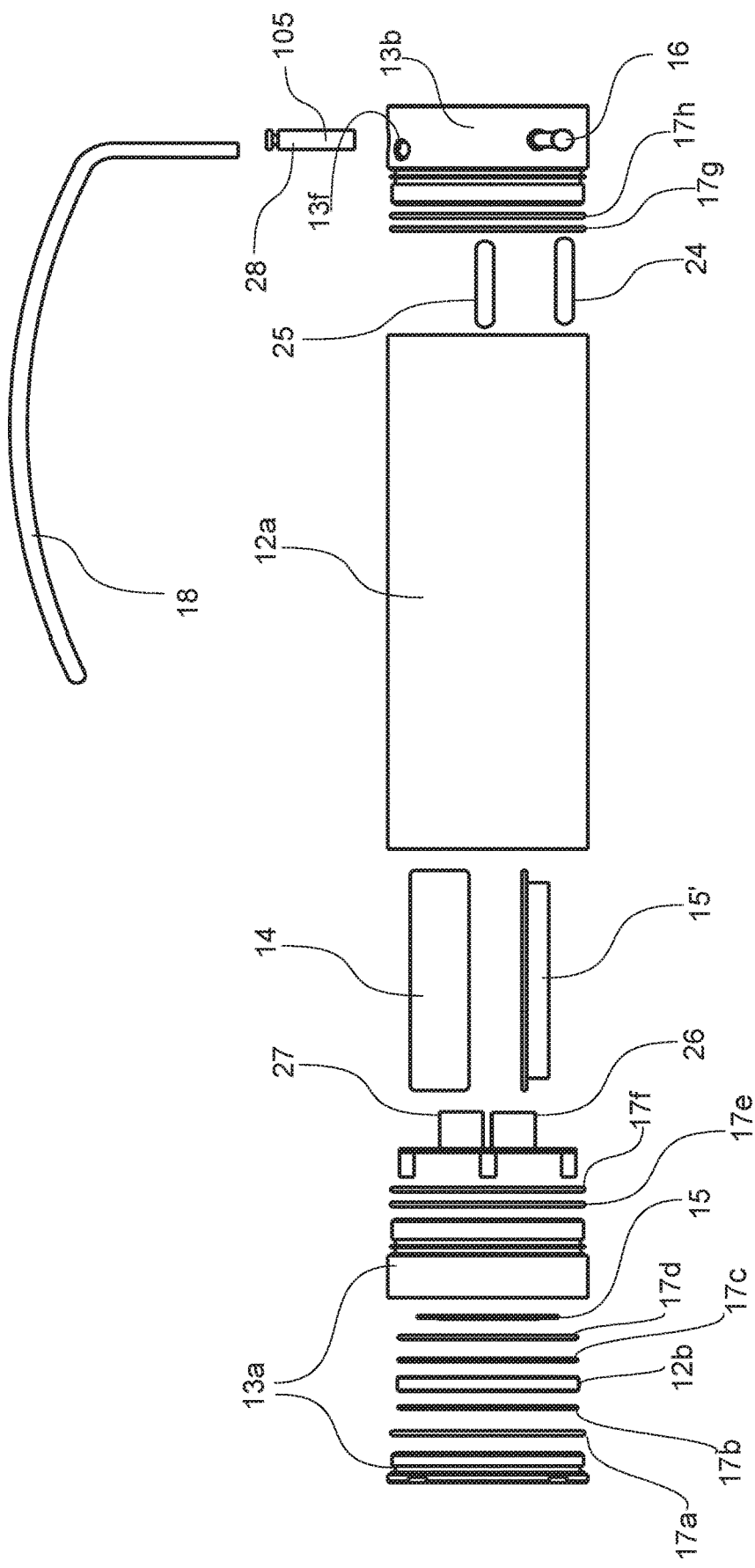
FIG. 1c is an exploded drawing of the flashlight visible in FIG. 1a presenting its main elements.

In the case of the embodiment shown in FIGS. 1a and 1b, the casing 12 contains a first sealing element 13a and a second sealing element 13b fixed to the ends (bases) of the cylindrical mantle shaped frame 12a. The sealing elements 13a, 13b are preferably fixed to the frame 12a in a releasable manner (e.g. using a screw thread), but naturally other fixing methods are also conceivable, such as gluing, soldering, etc., as is obvious for a person skilled in the art. The sealing elements 13a, 13b may consist of one or more elements, and may be made of plastic, metal or other solid material resistant to water. In the case of a preferable embodiment the sealing elements 13a, 13b are fixed to the frame 12a using threads, and one or more sealing rings 17a, 17b, 17c, 17d, 17e, 17f, 17g, 17h are arranged between the sealing elements 13a, 13b and the frame 12, as can be seen in FIG. 1c. The sealing rings 17a, 17b, 17c, 17d, 17e, 17f, 17g, 17h may be, for example, O-rings known of by persons skilled in the art, which may be made from, for example, rubber, or other flexible material that ensures a seal between the frame 12a and the sealing elements 13a, 13b, in other words that prevents water leaking in between the frame 12a and the sealing elements 13a, 13b, and prevents the components arranged in the frame 12a getting wet.

In the case of an especially preferable embodiment the light-transmitting region 12b is a disc shaped, high-quality piece of plate glass, for example, Opti White™ type low-iron glass, which is established in the first sealing element 13a. Optionally, the use of other types of plate glass is also conceivable, as is known by a person skilled in the art.

The rechargeable battery 14 is preferably a lithium-based (e.g. lithium-ion, lithium-polymer) battery with a positive and a negative pole, but the use of batteries operating on the basis of another principle is conceivable, such as NiMH, NiCd, etc. batteries, as is obvious for a person skilled in the art.

The charging connection 16 is preferably made from an electrically conducting material, such as a contact surface made from metal, or a standard connection, such as a USB or micro USB connection, etc. The at least one charging connection 16 contains a positive polarity contact 16p' that may be electrically connected to the positive pole of the battery 14 and a negative polarity contact 16n' that may be electrically connected to the negative pole of the battery 14. Optionally, the contacts 16p' and 16n' may also be arranged within a single charging connection 16 (such as in the case of a USB, or micro USB connection), as is known of by a person skilled in the art.

In the case of an especially preferable embodiment, the contacts 16p' and 16n' are established in charging connections 16p, 16n arranged separately from each other in the external surface of the casing 12, as can be seen in FIGS. 1a and 1b. In the case of this embodiment the material of the contacts 16p' and 16n' is preferably bronze, which is resistant to the corroding effect of salty water (seawater).

In the case of a preferable embodiment the flashlight 10 contains a handle 18, which may be fixed to the frame 12a, or optionally to the second sealing element 13b and which makes the use of the flashlight 10 easier. The fixing of the handle 18 may take place in a non-releasable way (for example by welding, soldering, gluing, etc.), or preferably in a releasable way (for example, by using screws).

Figure 2A:
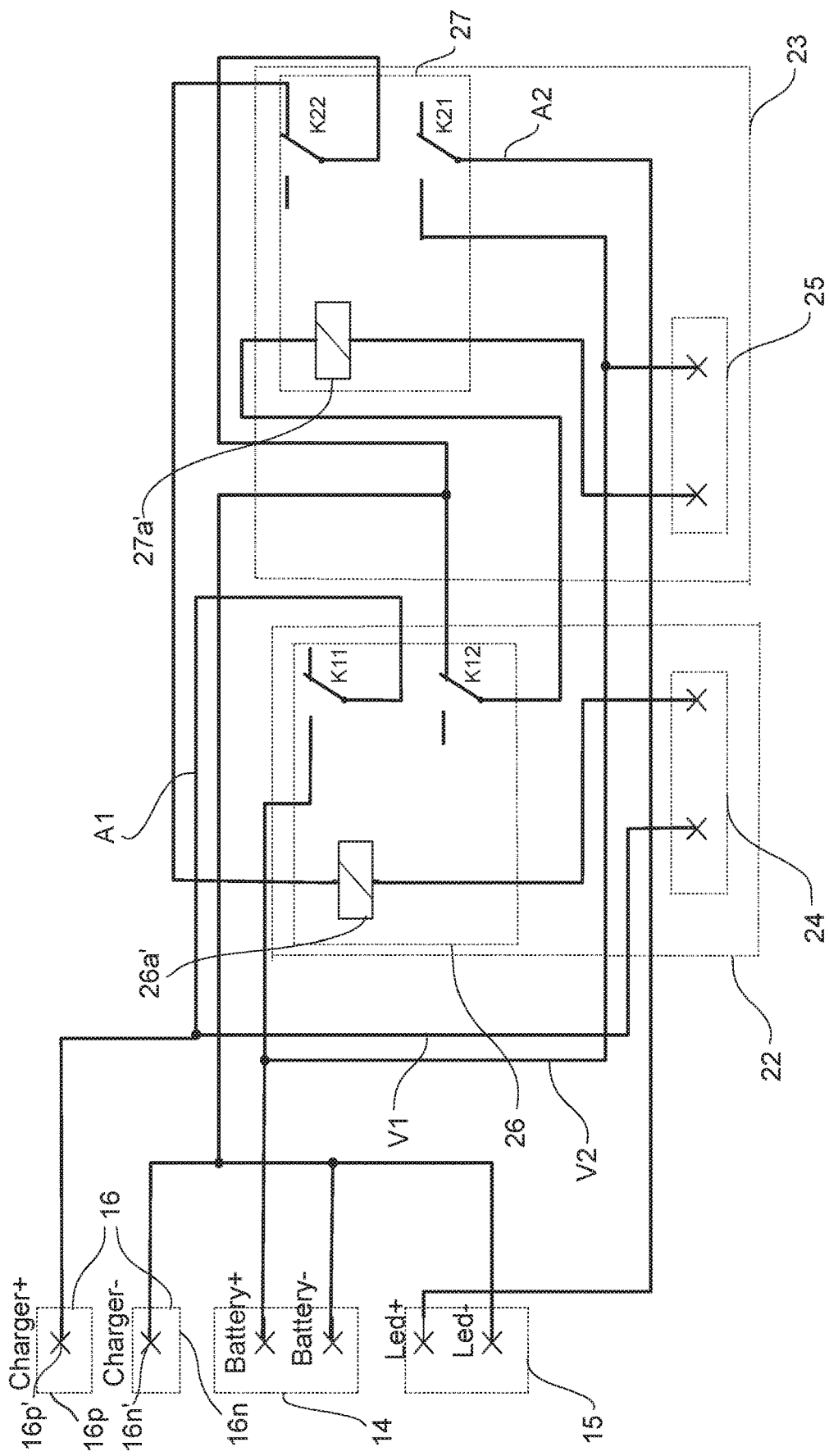

A charging switching unit 22 for breaking and ensuring the electric connection between the rechargeable battery 14 and the at least one charging connection 16 is arranged inside the waterproof casing 12, which is illustrated in FIG. 2a showing the schematic circuit diagram of the main elements of the flashlight 10 with a dotted line. In the context of the present invention ensuring the electric connection between the battery 14 and the charging connection 16 means that a continuous connection made of a conducting material, preferably metal is provided between the battery 14 and the charging connection 16, through which electricity may freely flow between the battery 14 and the charging connection 18.

Contrary to this, breaking the electric connection between the battery 14 and the charging connection 16 means that electricity is prevented from flowing between the battery 14 and the charging connection 16 by breaking the continuous connection constructed from a conducting material between the battery 14 and the charging connection 16.

The charging switching unit 22 contains a first magnetic switch 24 that has a first position and a second position, which may be switched using a first magnet 104 outside the casing 12. The magnetic switch 24 is preferably a reed relay, but naturally the use of other switches that are controlled with a magnetic field, e.g. Hall sensor, is also conceivable.

A reed relay is a type of relay, which essentially is a small sealed glass tube filled with a protective gas which contains two ferromagnetic electrodes close to one another, but that are not in contact with each other in the basic state (first position). Optionally, the electrodes are coated with a precious metal to improve their conducting characteristics. On placing the reed relay in a magnetic field, or on placing a permanent magnet (or electromagnet) near to the reed relay the facing electrodes become magnetised and their polarities will become opposite. Therefore they attract one another and the electrodes close (second position). On terminating the magnetic field, in other words removing the magnet from the proximity of the reed relay the attraction is terminated, and so the electrodes return to their basic position and move away from each other.

The charging switching unit 22 contains a first relay 26 controlled by the first magnetic switch 24—a reed relay in the present embodiment. In the context of the present invention the first relay 26 is understood as being a switching element that can be switched using the electricity (control voltage) regulated by the first magnetic switch 24. In the case of a preferable embodiment the first relay 26 contains an electromagnet 26a' and two-position switches K11 and K12, the relationship between which is illustrated with a dotted line in FIG. 2a. The operation of the electromagnet and the switches K11, K12 is explained in detail in the following.

Optionally, the first relay 26 may also be a so-called solid state relay, in which there are no moving parts, as is known by a person skilled in the art. In the case of a preferable embodiment the performance of the first relay 26 is at least 30 watts.

In the case of the embodiment shown in FIG. 2a, the charging switching unit 22 is configured so that when the first magnetic switch 24 is in its first position, in other words when the electrodes of the reed relay are not touching, the electromagnet 26a' does not receive current, therefore the electric connection between the battery 14 and the at least one charging connection 16 is broken.

In the case of an especially preferable embodiment of the flashlight 10 according to the invention, an operating switching unit 23 suitable for breaking and ensuring the electric connection between the rechargeable battery 14 and the light source 15 is arranged within the casing 12, which has also been illustrated with a dotted line. In order to avoid ambiguity it should be noted that what was stated earlier is understood as meaning breaking and ensuring the electric connection.

The operating switching unit 23 contains a second magnetic switch 25 that has a first position and a second position that may be switched using a second magnet 105 located outside the casing 12. The second magnetic switch 25 is preferably a reed relay or another switch that may be controlled with a magnetic field, e.g. a Hall sensor.

The operating switching unit 23 contains a second relay 27 controlled by the second magnetic switch 25. The second relay 27 is understood as being a switching element that may be switched with the electric current regulated by the second magnetic switch 25. In the case of a preferable embodiment the second relay 27 contains an electromagnet 27a', as well as two-position switches K21 and K22, the relationship between which is illustrated with a dotted line in FIG. 2a. The operation of the electromagnet and the switches K21, K22 is explained in detail in the following.

Optionally the second relay may also be a so-called solid state relay, in which there are no moving parts, as is known by a person skilled in the art. In the case of a preferable embodiment the performance of the second relay 27 is at least 30 watts.

The operating switching unit 23 is configured so that when the second magnetic switch 25 is in its first position, the electric connection between the battery 14 and the light source 15 is broken. In other words, in the case when the second magnetic switch is in the first position, the operating switching unit 23 interrupts the electric connection between the battery 14 and the light source 15.

Four circuits may be determined in the circuit diagram illustrated in FIG. 2a, which have been separately illustrated with thick lines in FIGS. 2d to 2g.

Figure 2B:
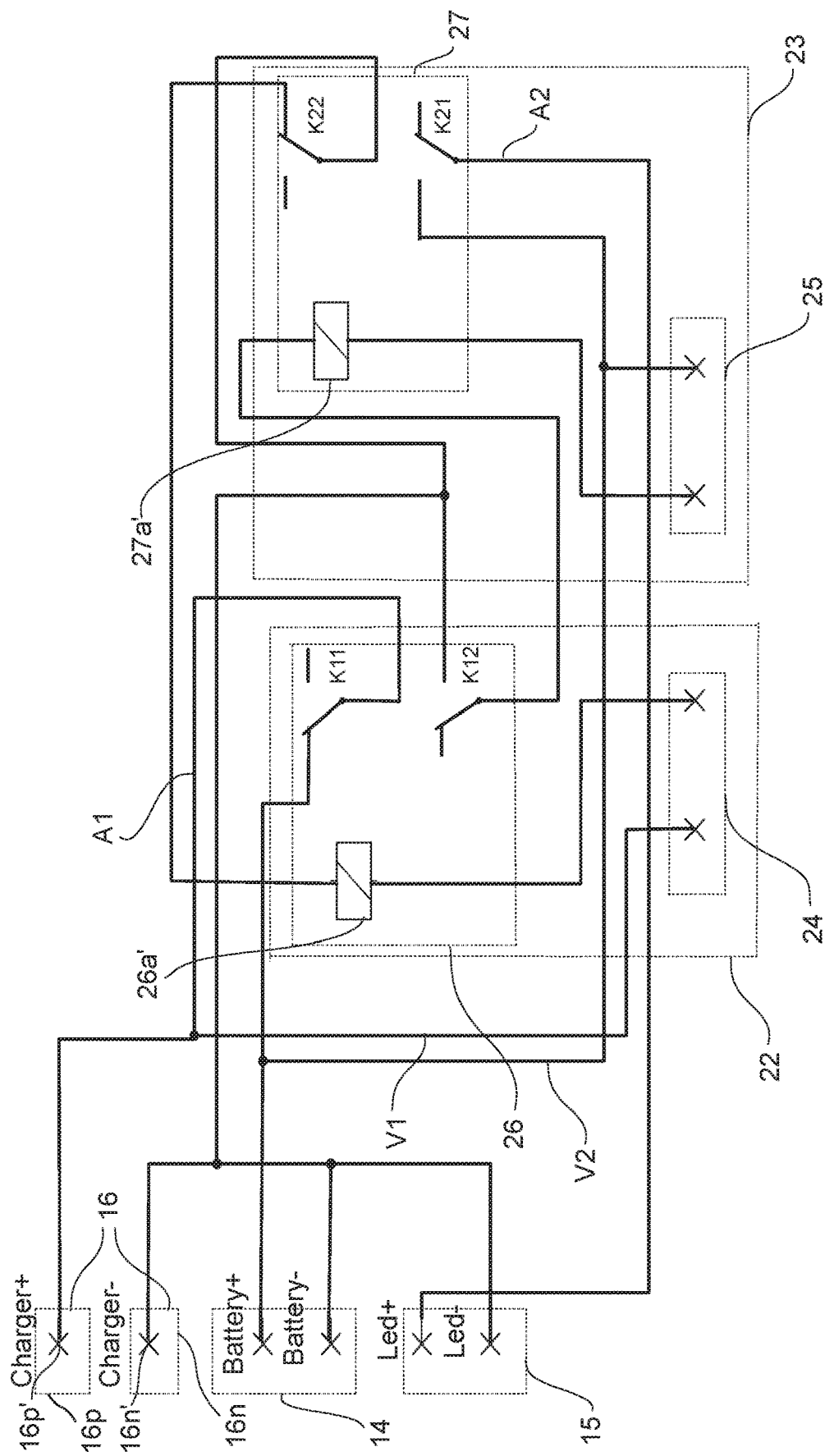
FIG. 2b is a schematic circuit diagram illustrating the operation of the first relay according to the invention.
Figure 2C:
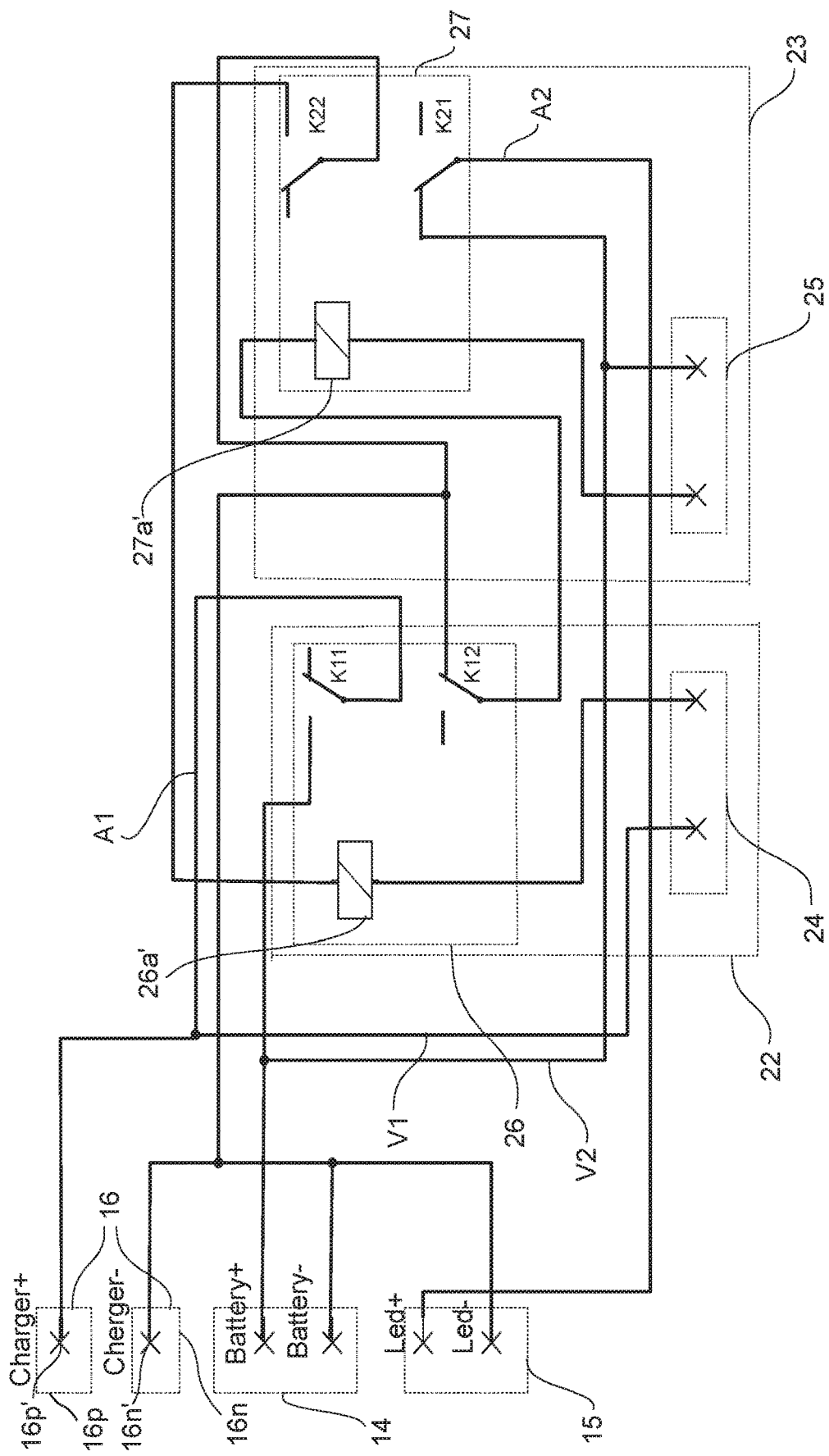
FIG. 2c is a schematic circuit diagram illustrating the operation of the second relay according to the invention.
Figure 2D:
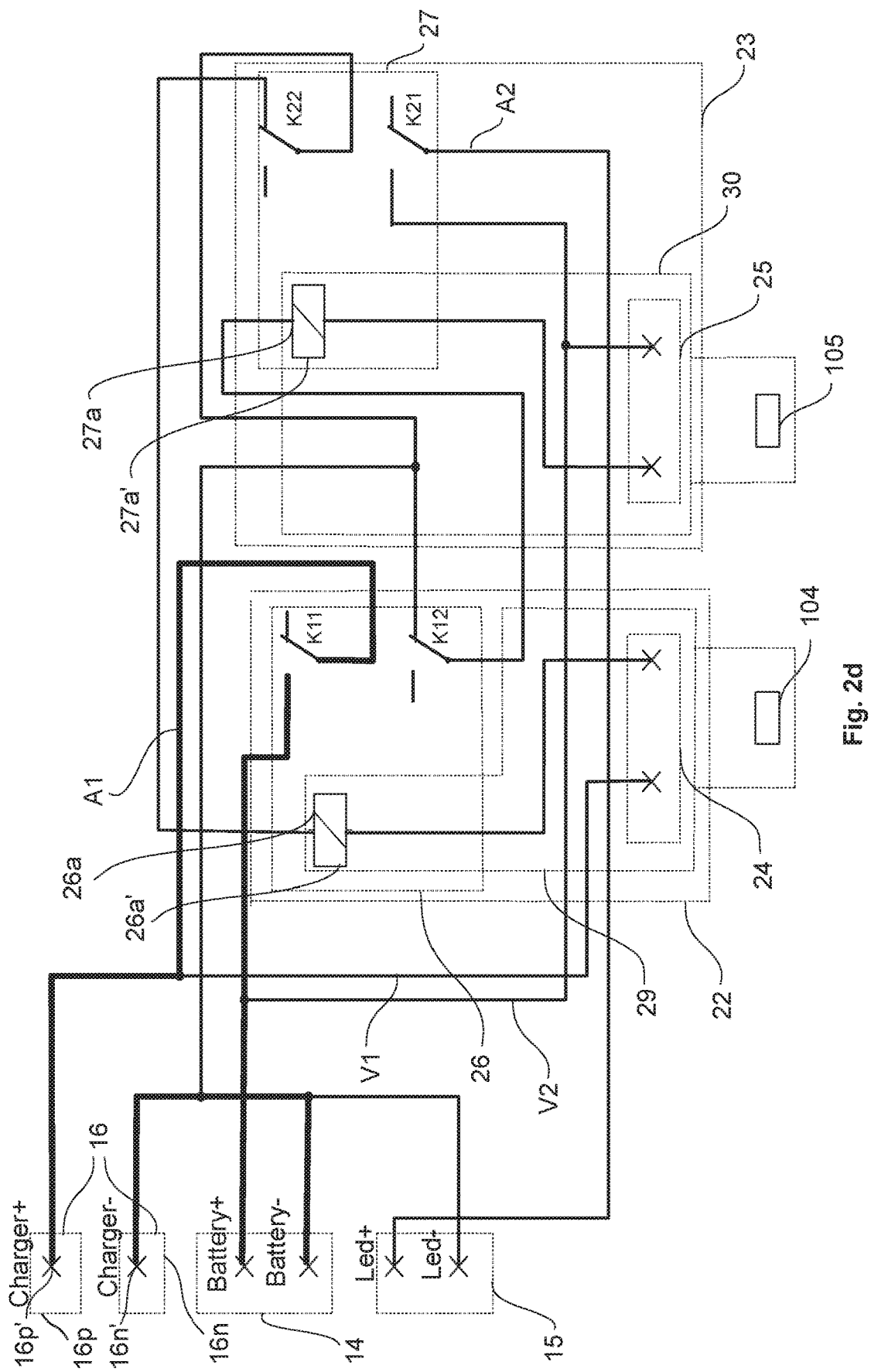

The first circuit A1 seen in FIG. 2d ensures an electric connection between the rechargeable battery 14 and the at least one charging connection 16. The first circuit A1 connects the positive contact 16p' with the negative contact 16n', so that the battery 14 is also a part of the circuit A1. The first circuit A1 may be interrupted with the switch K11, which is controlled by the charging switch controller 29 with the help of the first magnet 104 outside of the casing 12. In the case of the present embodiment, the first magnetic switch 24 and the first switch controller 26a formed as the electromagnet 26a' of the first relay 26 are parts of the charging switch controller 29 it should be noted that the first magnet 104 is also viewed as a part of the charging switch controller 29.

Figure 2E:
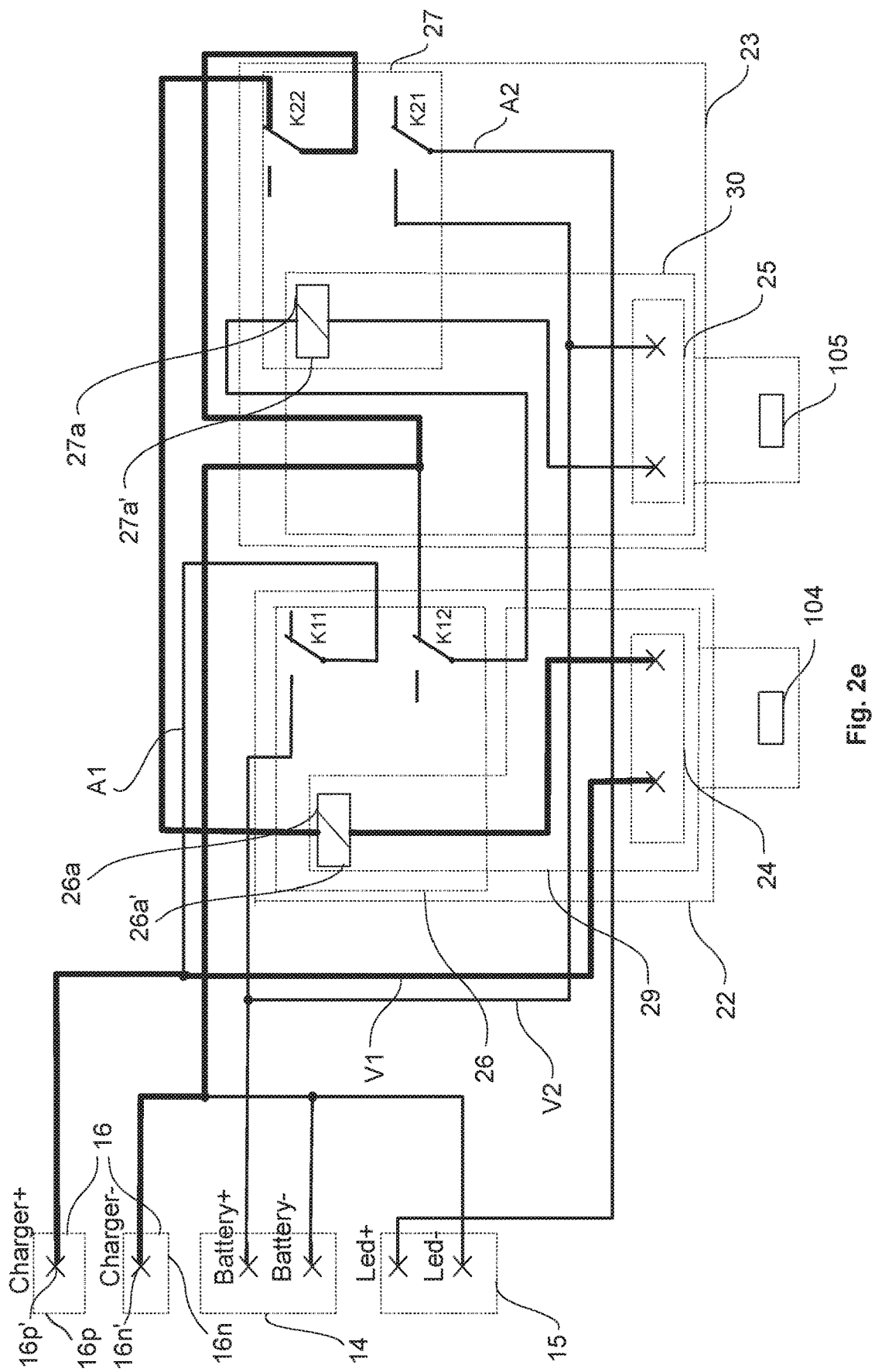

The first control circuit V1 illustrated in FIG. 2e connects the positive contact 16p' of the at least one charging connection 16 with its negative contact 16n'. The first magnetic switch 24 controlled by the first magnet 104 outside the casing 12, breaking the first control circuit V1 in a first position and closing it in a second position, and the first switch controller 26a controlled by the first magnetic switch 24, suitable for taking the first switch K11 from the first position to the second position are connected in the first control circuit V1, and the latter is preferably the first electromagnet 26a'.

Figure 2F:
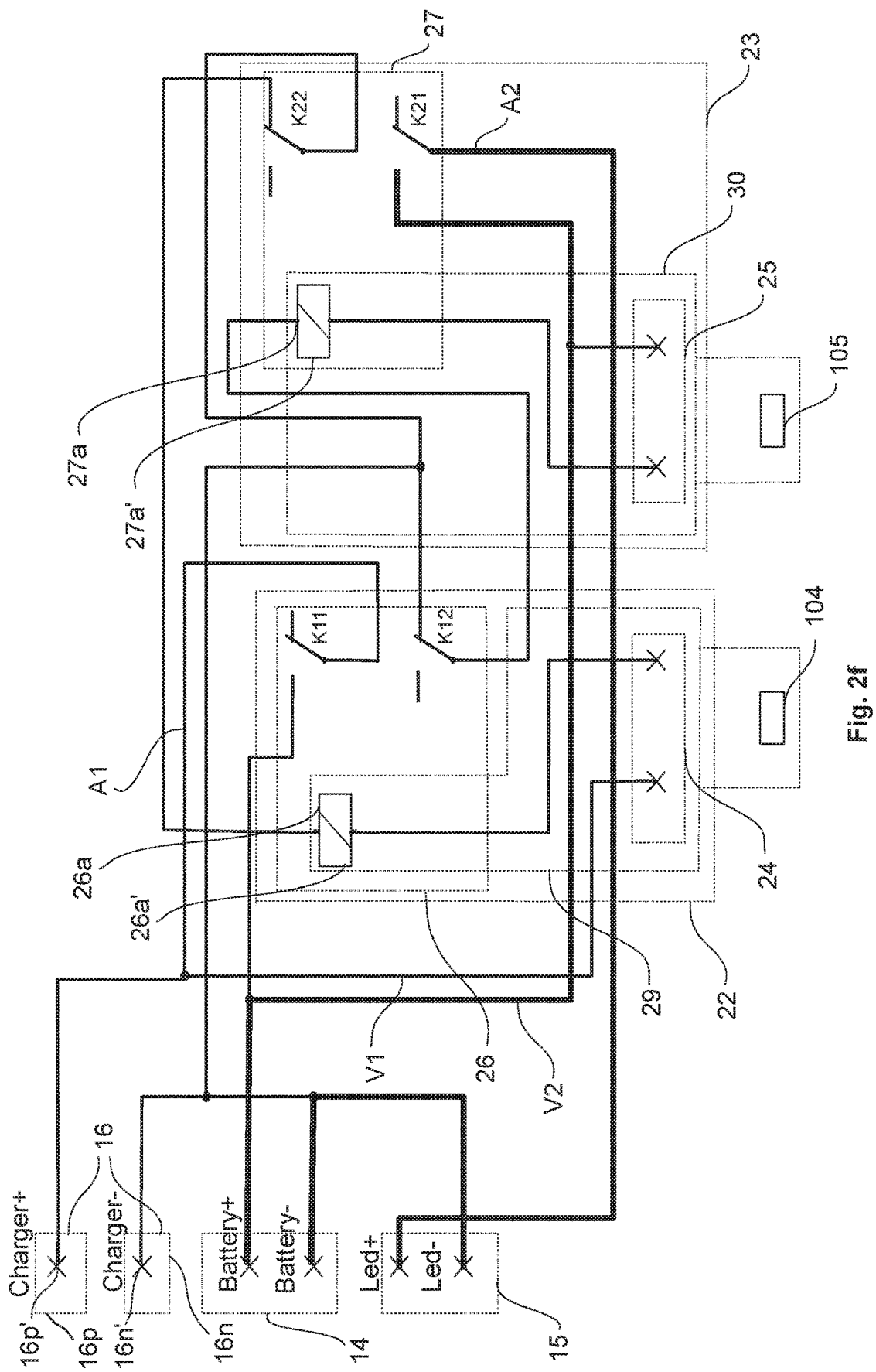

The second circuit A2 shown in FIG. 2f ensures the electric connection between the light source 15 and the rechargeable battery 14. The second circuit A2 connects the positive and negative poles of the battery 14 together so that the light source 15 is also a part of the circuit A2. The second circuit A2 may be interrupted with the switch K21, which is controlled by the operating switch controller 30 with the help of the second magnet 105 outside the casing 12 and marked with a dotted line. In the case of the present embodiment the second magnetic switch 25, and the second switching controller 27a formed as the electromagnet 27a' of the second relay 27 are parts of the operating switch controller 30. It should be noted that the second magnet 105 is also to be viewed as a part of the operating switch controller 30.

Figure 2G:
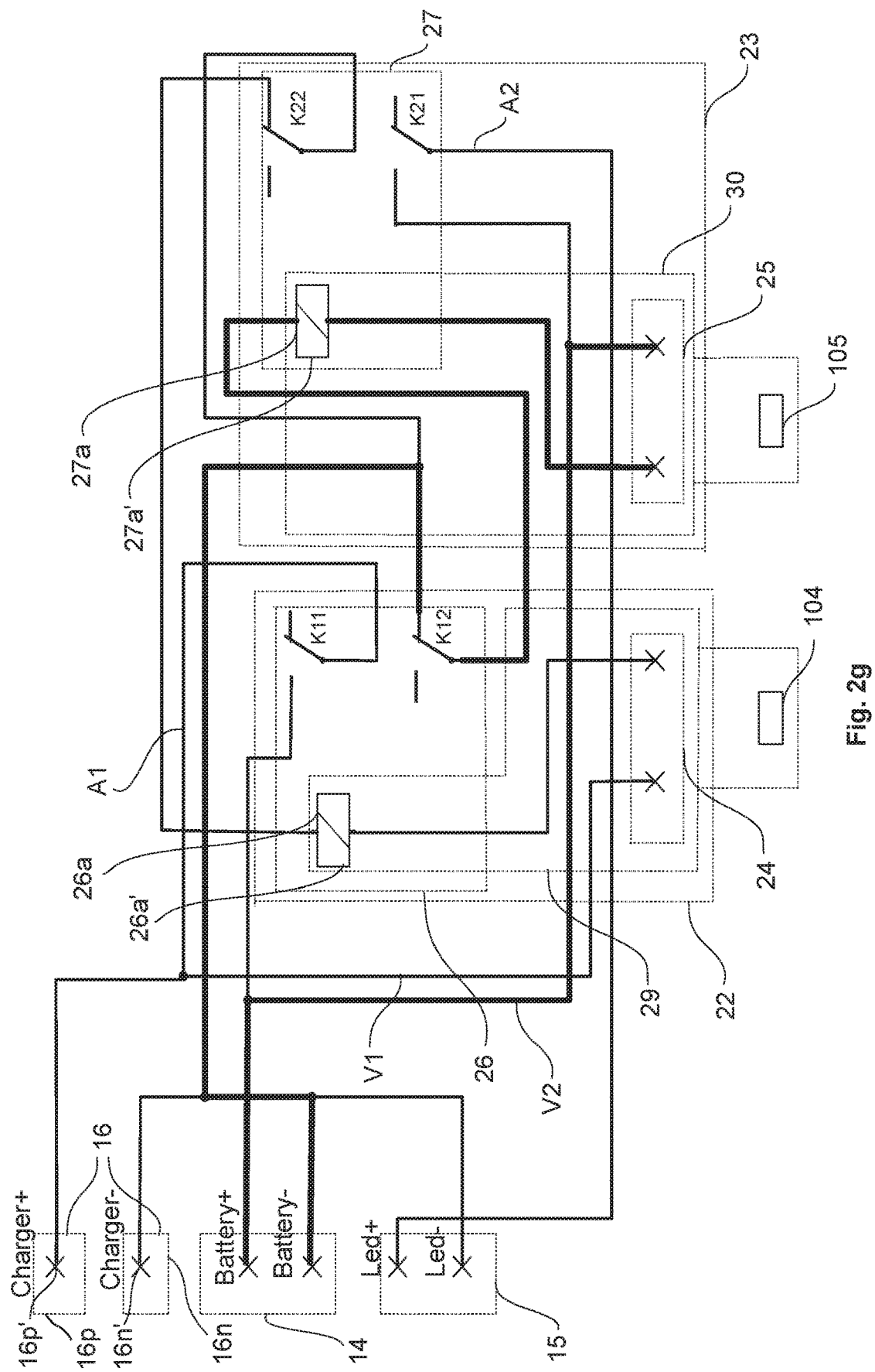

The second control circuit V2 shown in FIG. 2g connects the positive contact 16p' of the at least one charging connection 16 with its negative contact 16n'. The second magnetic switch 25 controlled by the second magnet 105 outside the casing 12, interrupting the second control circuit V2 in a first position and closing it in a second position, and the second switching controller 27a controlled by the second magnetic switch 25, suitable for taking the second switch K21 from the first position to the second position are connected in the second control circuit V2, and the latter is preferably the second electromagnet 27a'.

As if can be seen, the switch K12 of the first relay 26 is interposed in the second control circuit V2, through this in the first position it interrupts and in the second position it closes the second control circuit V2. Naturally, an embodiment is conceivable in which the charging switch controller 29 contains further switch controllers separate from the first switch controller 26a for controlling the auxiliary switch K12, which may also be activated by the first magnetic switch 24 in the way described previously.

Similarly, the switch K22 of the second relay 27 is interposed in the first control circuit V1, through which it interrupts the second control circuit V2 in a first position and closes it in a second position. Naturally, an embodiment may be conceived in which the operating switch controller 30 contains further switch controllers separate from the second switching controller 27a for controlling the auxiliary switch K22, which may also be activated by the second magnetic switch 25 in the way described previously.

The auxiliary switches K12 and K22 ensure that it is not possible to charge the flashlight 10 through the charging connection 16 and provide current to the light source 15 from the battery 14 at the same time.

In the case of a preferable embodiment, the first magnetic switch 24 and the second magnetic switch 25 are arranged within the casing 12, in the vicinity of the second sealing element 13b, and a bore 13f is formed in the sealing element 13b in the vicinity of the second magnetic switch 25 (see FIG. 1a).

In the case of the embodiment of the flashlight 10 shown in FIGS. 1a and 1b, the permanent second magnet 106 serving for switching the second magnetic switch 25 into its second position is arranged in an external switching unit 28 established outside of the casing 12 and which may be preferably separated from the casing 12 to an optional extent. Naturally, an embodiment may be conceived in which the external switching unit is fixed to the casing 12, with the help of a cord, for example. The external switching unit may be a body in the shape of a cylinder, rectangular block or any other shape containing or functioning as a permanent magnet, which may be preferably fitted into the bore 13f.

The light source 15 is preferably a high power LED and/or COB LED with positive and negative poles (terminals). In the case of this embodiment, the flashlight 10 also contains a control panel 15' interposed between the LED and the battery 14 (e.g. in the second circuit A2) which ensures that the LED connected to the battery 14 gets an even voltage that is constant over time, as is known to a person skilled in the art.

The spectrum of the electromagnetic radiation emitted by the light source 16 is preferably in the visible wavelength range, in other words between approximately 400 and 800 nm.

The present invention also comprises a charging unit 102 that may be attached to the portable flashlight 10 suitable for underwater use and that is suitable for charging the battery 14 through the at least one charging connection 16. The charging unit 102 contains a first magnet 104 suitable for switching the first magnetic switch 24 from its first position to its second position, and which is preferably a permanent magnet, such as a neodymium magnet. Optionally, and embodiment may be conceived in which the first magnet 104 is an electromagnet.

Figure 3:
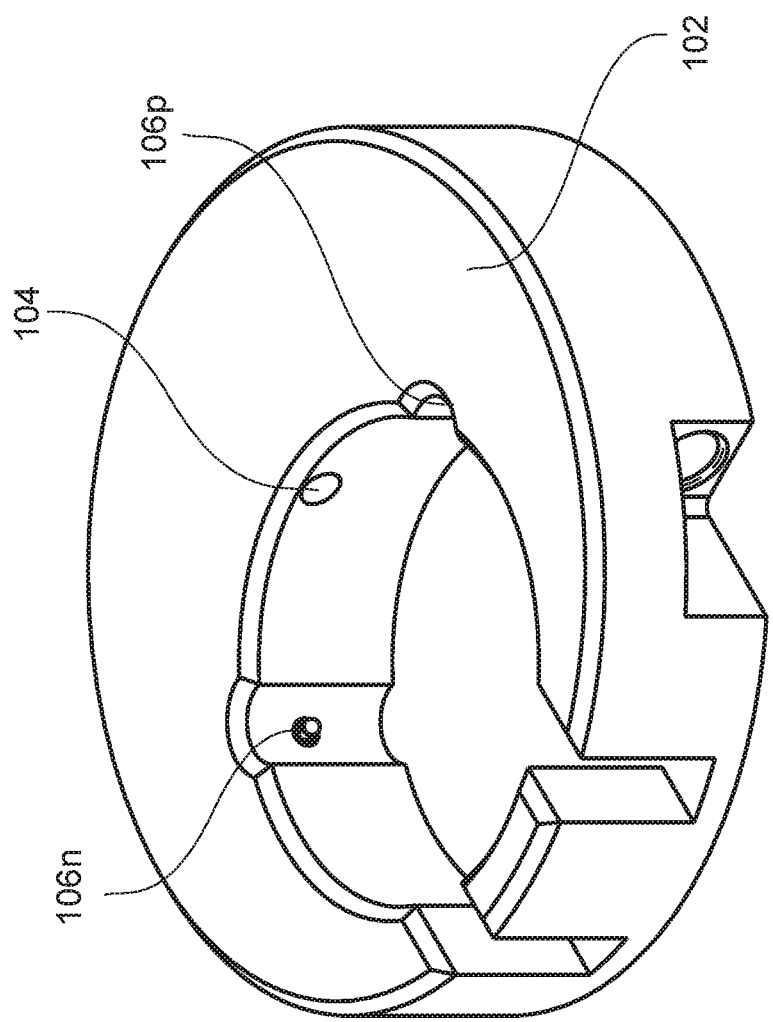
FIG. 3 is a schematic perspective view illustrating a preferable embodiment of a charger unit of a flashlight according to the invention.

In the case of the embodiment shown in FIG. 3, the charging unit 102 is formed as a docking unit that may be fitted to the flashlight 10. In the case of an especially preferably embodiment the docking unit may only be fitted to the flashlight 10 without the external switching unit 28 being fitted, in other words, only after it has been removed. The docking unit has negative 106n and positive 106p charging connections complying with the contacts 16p', 16n', furthermore, it may also optionally contain further electronic elements, such as a transformer for transforming the mains electricity, and/or a cooling fan, etc. as is obvious for a person skilled in the art.

FIG. 4 illustrates a perspective view of the flashlight according to the invention connected to the charging unit 102.

In the following the operation of the flashlight 10 and the charging unit 102 according to the invention is presented.

FIG. 2a shows the circuit diagram of the main elements of the flashlight 10 presented in FIG. 1a in the state when both magnetic switches 24, 25 are in the first position. In this case electric current is not flowing through the electromagnets 26a', 27a', and the switches K11 and K21 are in open state, while the switches K12 and K22 are closed.

When current flows through the electromagnet 26a', the magnetic field generated simultaneously closes the switch K11 and opens the switch K12, as can be seen in FIG. 2b. The first relay 26 is set up in such a way that after the electromagnet 26a' has been switched off, in other words when the magnetic field is shut off, the switches K11 and K12 return to the open and closed position by themselves.

Similarly, when electric current is flowing through the electromagnet 27a', the generated magnetic field closes switch K21 and opens switch K22, as can be seen in FIG. 2c. The second relay is set up in such a way that when the electromagnet 27a' is switched off, in other words after the magnetic field has been shut off, the switches K21 and K22 return to the open and closed position by themselves.

In the case when the first magnetic switch 24 is in the first position, in other words when the first magnetic switch 24 is not fitted in the charging unit 102, the switch K11 of the first relay 26, as depicted in FIG. 2a, is in open position, therefore the electric connection between the positive contact 16p' of the charging connection 16 and the positive pole of the battery 14 is interrupted. As due to this the positive pole of the battery 14 is essentially isolated from the positive contact 16p' even by short-circuiting the contacts 16n', 16p' (such as by dipping simultaneously into water) the positive and negative poles of the battery 14 are unable to short-circuit and discharge the battery 14. Therefore there is no need to separately insulate the contacts 16n', 16p', which is a significant step forward as compared to the solutions in the prior art.

In the case of the embodiment seen in FIGS. 2a, 2b and 2c the negative contact 16n' of the charging connection 16 and the negative pole of the battery 14 are directly connected to each other, with the help of a piece of metal wire, for example. In order to recharge the battery 14 the electrical connection needs to be ensured between the positive contact 16p' of the charging connection 16 and the positive pole of the battery 14, in other words the switch K11 must be closed.

In order to start charging the external switching unit 28 is removed, the flashlight 10 is inserted into the charging unit 102 formed as a docking unit, then voltage is switched onto the contacts 16p', 16n'. By removing the external switching unit 28 the second magnetic switch 25 gets into its first position (in other words open), so the electromagnet 27a' of the second relay 27 does not get current and the switch K22 moves into closed position, as can be seen in FIG. 2a. The switch K22 is interposed in the electric connection between the negative contact 16n' and the electromagnet 26a' of the first relay 26 in such a way that with the switch K22 in closed position the electric connection between the negative contact 16n' and the electromagnet 26a' of the first relay 26 is ensured, while with the switch K22 in open position the electric connection between the negative contact 16n' end the electromagnet 26a' of the first relay 26 is interrupted.

By inserting the flashlight 10 the first magnet 104 established in the charging unit 102 switches the first magnetic switch 24 from first position to second position, due to this the electromagnet 26a' of the first relay 26 also becomes electrically connected to the positive contact 16p' so the voltage switched onto the contacts 16p', 16n' switches on the electromagnet 26a' of the first relay 26. The magnetic field generated by the electromagnet 26a' closes the switch K11, and opens switch K12, as can be seen in FIG. 2b. By closing switch K11 the positive contact 16p' becomes electrically connected to the positive pole of the battery 14, and so the charging of the battery 14 starts with the help of the voltage switched onto the contacts 16p' and 16n'.

In the ease that the user succeeds in placing the flashlight 10 into the charging unit 28 in such a way that be or she has not removed the external switching unit 28 from the flashlight 10, the switching arrangement shown in FIG. 2a prevents charging of the battery 14. In the case of the example illustrated in FIG. 2c, before the flashlight 10 is placed in the charging unit 102, the first magnetic switch 24 is in the first (open) position and the second magnetic switch 25 is in the second (closed) position. With the first magnetic switch 24 in the first position the switch K12 of the first relay 26 is in closed position, due to this the electric connection between the electromagnet 27a' of the second relay 27 and the negative pole of the battery 14 is ensured. With the second magnetic switch 25 in second position there is also an electric connection between the electromagnet 27a' and the positive pole of the battery 14, so electric current is able to flow from the battery 14 to the electromagnet 27a'. The magnetic field generated by the electromagnet 27a' opens the switch K22 and closes the switch K21.

The negative pole of the battery 14 is directly connected to the negative pole of the light source, an LED in the present case. By closing switch K21 an electric connection is created between the positive pole of the light source 15 and the positive pole of the battery 14, and the light source 15 starts to operate.

While the flashlight 10 is working, in other words when the light source 15 is operating, the switch K22 is in open position, due to this the electric connection between the negative contact 16n' of the charging connection 16 and the electromagnet 26a' of the relay 26 is interrupted. Due to this even by switching the magnetic switch 24 into second position (e.g. by placing the flashlight 10 into the charging unit 102) the electromagnet 26a' is unable to obtain current, in other words switch K11 is unable to close. Therefore charging of the battery 14 can only start after the second magnetic switch 25 is put into open position, in other words the external switching unit 28 is removed. Therefore, the switching arrangement presented above ensures that the first relay 26 and the second relay 27 are unable to get electric current at the same time, so simultaneous charging of the battery 14 and the operation of the light source 15 is not possible. To put it another way, in the case that both magnetic switches 24, 25 are switched to the second position that relay 26, 27 will get current the associated magnetic switch 24, 25 of which was first switched to second position. In this way faults may be avoided deriving from the users carelessness.

In the case of a preferable embodiment the use of the flashlight 10 takes place in the following way. After the flashlight 10 has been removed from the charging unit 102, and so the first magnetic switch 24 has been switched to first position, the external switching unit 28 is inserted into the bore 13f. The permanent magnet in the external switching unit 28 puts the second magnetic switch 25 into second position, and the light source 15 starts operations in the way presented above.

Alternative solutions to the embodiments presented here will be apparent to a person skilled in the art without departing from the scope of protection determined by the attached claims.

The invention claimed is:
1. Portable flashlight for underwater use, which flashlight (10) has a waterproof casing (12), a rechargeable battery (14) arranged within it, a light source (15), as well as at least one charging connection (16, 16p, 16n) arranged on the external surface of the casing (12) and electrically isolated from the casing (12), and
  a first electric circuit (A1) is provided for ensuring electric connection between the rechargeable battery (14) and the at least one charging connection (16), and
  a second electric circuit (A2) is provided for ensuring electric connection between the rechargeable battery (14) and the light source (15)
characterised by that a first control circuit (V1) is provided between the two contacts (16p', 16n') of the at least one charging connection (16) and a second control circuit (V2) is provided between the two poles of the rechargeable battery (14), and it comprises a charging switching unit (22) that has
  a first switch (K11) connected to the first circuit (A1) for breaking the first circuit (A1) in a first position and for closing the first circuit (A1) in a second position,
  a first auxiliary switch (K12) connected into the second control circuit (V2), breaking the second control circuit (V2) in a first position, and closing it in a second position and
  a charging switch controller (29) for controlling the first switch (K11) and the first auxiliary switch (K12) with a first magnet (104) arranged outside the casing (12),
and it comprises an operating switching unit (23) that has
  a second switch (K21) connected into the second circuit (A2) for breaking the second circuit (A2) in a first position and for closing it in a second position,
  a second auxiliary switch (K22) connected into the first control circuit (V1) breaking the first control circuit (V1) in a first position and closing it in a second position and
  an operating switch controller (30) controlling the second switch (K21) and the second auxiliary switch (K22) with a second magnet (105) arranged in an external switching unit (28).

2. Flashlight according to claim 1, characterised by that the charging switch controller (29) comprises:
- a first magnetic switch (24) connected into the first control circuit (V1), and controlled by the first magnet (104), the first magnetic switch (24) being provided for breaking the first control circuit (V1) in a first position and closing the first control circuit (V1) in a second position, and
- a first switch controller (26*a*) connected into the first control circuit (V1) for switching the first switch (K11) from the first position to the second position.

3. Flashlight according to claim 2, characterised by that the first magnetic switch (24) is a reed relay and the first magnet (104) is a part of the charging switch controller (29).

4. Flashlight according to claim 2, characterised by that the charging switching unit (22) contains a first relay (26) with a power rating of at least 30 watts, and the first switch controller (26*a*), the first switch (K11) and the first auxiliary switch (K12) are a part of the first relay (26).

5. Flashlight according to claim 2, characterised by that the first switch (K11) of the charging switching unit (22) is a part of the first magnetic switch (24), and the first magnet (104) is a part of the charging switch controller (29).

6. Flashlight according to claim 1, characterised by that it contains a disconnectable and reconnectable charging unit (102) suitable for charging the rechargeable battery (14) via the at least one charging connection (16), and the first magnet (104) is arranged in the charging unit (102).

7. Flashlight according to claim 6, characterised by that the charging unit (102) is formed as a docking unit, which can be connected to the flashlight (10) in the case that the second magnet (105) is removed from the casing (12).

8. Flashlight according to claim 1, characterised by that the operating switch controller (30) contains:
- a second magnetic switch (25) connected into the second control circuit (V2), controlled by the second magnet (105) for breaking the second control circuit (V2) in a first position and for closing it in a second position, and
- a second switching controller (27*a*) connected into the second control circuit (V2) and controlled by the second magnetic switch (25), for switching the second switch (K21) from the first position to the second position.

9. Flashlight according to claim 8, characterised by that the second magnetic switch (25) is a reed relay, and the second magnet (105) is a part of the operating switch controller (30).

10. Flashlight according to claim 8, characterised by that the operating switching unit (23) contains a second relay (27) with a power rating of at least 30 watts, and the second switching controller (27*a*), the second switch (K21) and the second auxiliary switch (K22) are a part of the second relay (27).

11. Flashlight according to claim 8, characterised by that the second switch (K21) of the operating switching unit (23) is a part of the second magnetic switch (25), and the second magnet (105) is a part of the operating switch controller (30).

12. Flashlight according to claim 1, characterised by that the light source (15) is an LED.

13. Flashlight according to claim 1, characterised by that the waterproof casing (12) contains a frame (12*a*) and a light-transmitting region (12*b*) that permits at least a part of visible light to pass through it.

14. Flashlight according to claim 13, characterised by that the light-transmitting region (12*b*) is plate glass.

15. Flashlight according to claim 13, characterised by that the frame (12*a*) has a cylindrical mantle shape and is made from anodised aluminium coated with a plastic film.

16. Flashlight according to claim 2, characterised by that the first switch controller (26*a*) is an electromagnet (26*a*′).

17. Flashlight according to claim 2, characterised by that the first magnetic switch (24) is a Hall sensor and the first magnet (104) is a part of the charging switch controller (29).

18. Flashlight according to claim 8, characterised by that the second switching controller (27*a*) is a second electromagnet (27*a*′).

19. Flashlight according to claim 8, characterised by that the second magnetic switch (25) is a Hall sensor, and the second magnet (105) is a part of the operating switch controller (30).

20. Flashlight according to claim 12, characterised by that the LED is a COB LED.

* * * * *